US007757555B2

(12) United States Patent
Pan et al.

(10) Patent No.: US 7,757,555 B2
(45) Date of Patent: Jul. 20, 2010

(54) TRI-AXIS ACCELEROMETER HAVING A SINGLE PROOF MASS AND FULLY DIFFERENTIAL OUTPUT SIGNALS

(75) Inventors: Zhiyu Pan, San Jose, CA (US);
Christoph Lang, Los Altos, CA (US);
Gary Yama, Mountain View, CA (US);
Matthias Metz, Palo Alto, CA (US);
Markus Ulm, Wann Weil (DE)

(73) Assignee: Robert Bosch GmbH, Stuttgart (DE)

( * ) Notice: Subject to any disclaimer, the term of this patent is extended or adjusted under 35 U.S.C. 154(b) by 844 days.

(21) Appl. No.: 11/513,669

(22) Filed: Aug. 30, 2006

(65) Prior Publication Data

US 2008/0053228 A1 Mar. 6, 2008

(51) Int. Cl.
*G01P 15/08* (2006.01)

(52) U.S. Cl. ............... 73/514.24; 73/514.01; 73/514.29

(58) Field of Classification Search ............ 73/514.01, 73/514.29, 488, 504.12, 504.13, 514.24
See application file for complete search history.

(56) References Cited

U.S. PATENT DOCUMENTS

| | | | | | |
|---|---|---|---|---|---|
| 4,932,259 | A | * | 6/1990 | Ueno | 73/514.29 |
| 4,987,779 | A | * | 1/1991 | McBrien | 73/514.18 |
| 5,006,487 | A | * | 4/1991 | Stokes | 438/52 |
| 5,134,881 | A | * | 8/1992 | Henrion et al. | 73/514.35 |
| 5,345,824 | A | * | 9/1994 | Sherman et al. | 73/514.18 |
| 5,383,364 | A | * | 1/1995 | Takahashi et al. | 73/514.32 |
| 5,440,939 | A | * | 8/1995 | Barny et al. | 73/862.61 |
| 5,441,300 | A | * | 8/1995 | Yokota et al. | 280/735 |
| 5,487,305 | A | * | 1/1996 | Ristic et al. | 73/514.32 |
| 5,511,420 | A | * | 4/1996 | Zhao et al. | 73/514.18 |
| 5,574,222 | A | * | 11/1996 | Offenberg | 73/514.32 |
| 5,587,518 | A | * | 12/1996 | Stevenson et al. | 73/1.38 |
| 5,748,004 | A | * | 5/1998 | Kelly et al. | 324/661 |
| 5,780,740 | A | * | 7/1998 | Lee et al. | 73/504.12 |
| 5,939,633 | A | * | 8/1999 | Judy | 73/514.32 |
| 6,070,464 | A | * | 6/2000 | Koury et al. | 73/514.32 |
| 6,370,954 | B1 | * | 4/2002 | Zerbini et al. | 73/514.01 |
| 6,513,380 | B2 | * | 2/2003 | Reeds et al. | 73/504.12 |
| 6,591,678 | B2 | * | 7/2003 | Sakai | 73/514.36 |
| 6,892,576 | B2 | * | 5/2005 | Samuels et al. | 73/514.32 |
| 7,051,590 | B1 | * | 5/2006 | Lemkin et al. | 73/504.04 |
| 2001/0032508 | A1 | * | 10/2001 | Lemkin et al. | 73/514.32 |
| 2002/0059829 | A1 | * | 5/2002 | Sakai | 73/504.12 |
| 2002/0189355 | A1 | * | 12/2002 | Leonardson | 73/514.32 |
| 2003/0163287 | A1 | * | 8/2003 | Vock et al. | 702/187 |
| 2006/0037397 | A1 | * | 2/2006 | Memishian | 73/514.32 |

\* cited by examiner

*Primary Examiner*—Hezron Williams
*Assistant Examiner*—Samir M Shah
(74) *Attorney, Agent, or Firm*—Kenyon & Kenyon LLP

(57) ABSTRACT

A tri-axis accelerometer includes a proof mass, at least four anchor points arranged in at least two opposite pairs, a first pair of anchor points being arranged opposite one another along a first axis, a second pair of anchor points being arranged opposite one another along a second axis, the first axis and the second axis being perpendicular to one another, and at least four spring units to connect the proof mass to the at least four anchor points, the spring units each including a pair of identical springs, each spring including a sensing unit.

10 Claims, 22 Drawing Sheets

Figure 3A
Figure 3B
Figure 3C
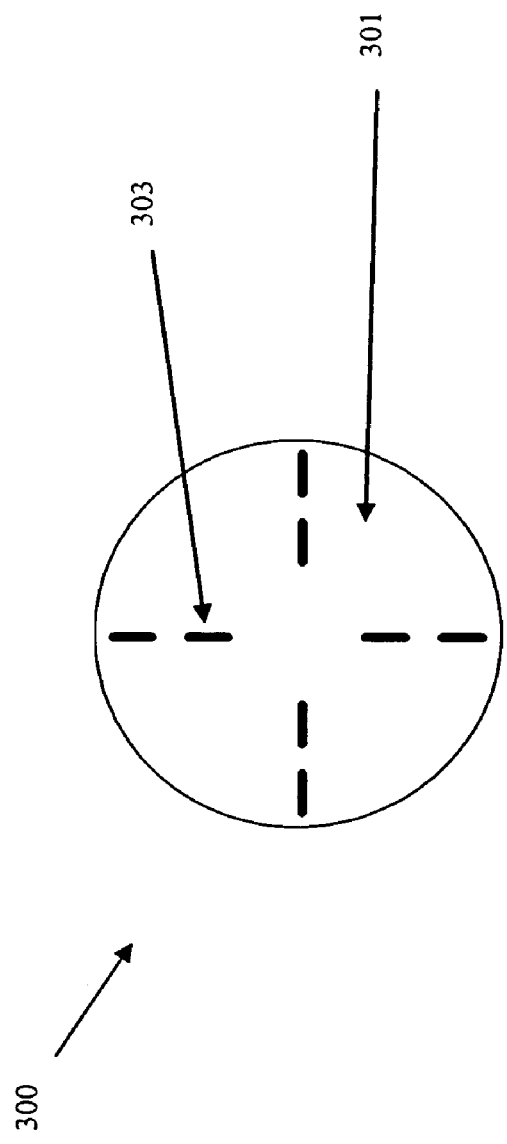
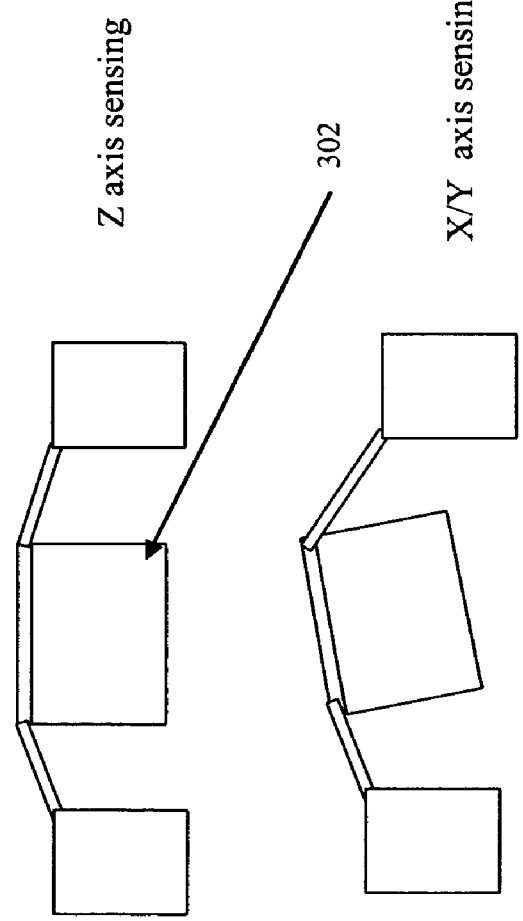
Z axis sensing
X/Y axis sensing Stage S1

Stage B1

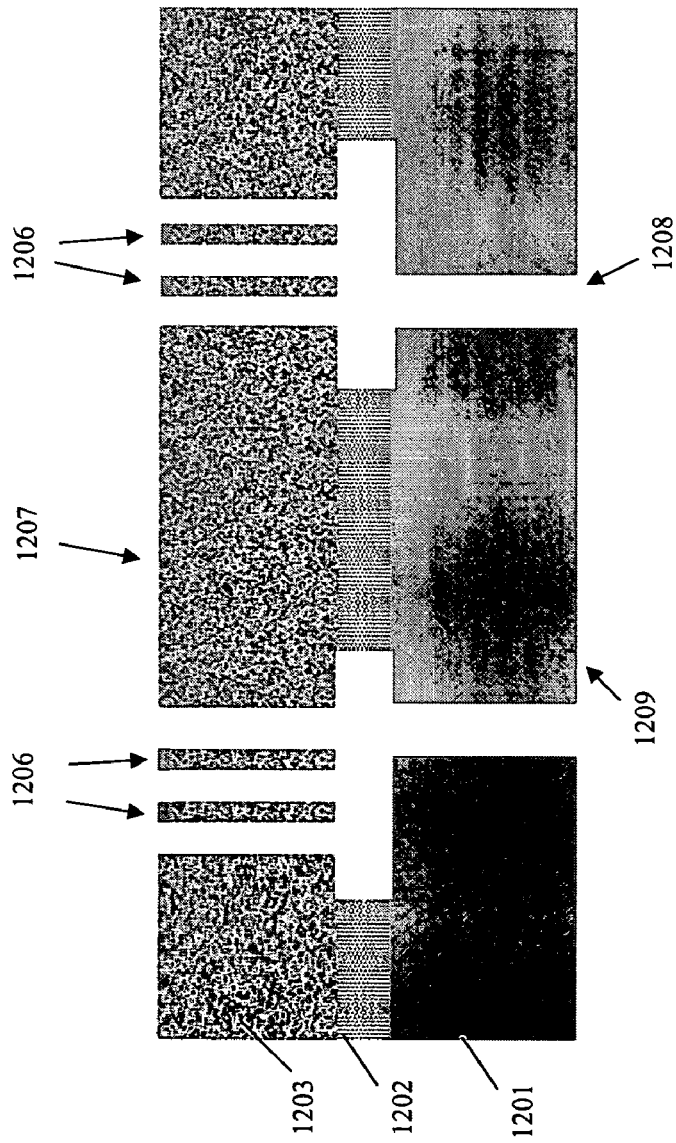

TRI-AXIS ACCELEROMETER HAVING A SINGLE PROOF MASS AND FULLY DIFFERENTIAL OUTPUT SIGNALS

FIELD OF THE INVENTION

The present invention relates to a tri-axis accelerometer having a single proof mass and fully differential output signals.

BACKGROUND INFORMATION

FIG. 1A shows a cantilever beam accelerometer 100, which includes a structure layer 101, a sensing unit 102, and an anchor 103. The structure layer 101 is rectangular in form and attached on one end to the anchor 3. The sensing unit 102, which is attached to the structure layer 101, senses a movement of the structure layer 101, which is free to move at the end opposite the anchor 103. Here, the sensing unit 102 may operate, for example, in a piezoelectric or piezoresistive manner.

FIG. 1B shows the cantilever beam accelerometer 100 of FIG. 1A with a proof mass 104 attached to its tip to generate more strain along the structure layer 100, which by its attachment to the anchor 103, forms a suspended beam to support the proof mass 104. As a result, the addition of the proof mass 104 may provide a more sensitive operation of the accelerometer of FIG. 1B as compared to the accelerometer of FIG. 1A.

Although the design of the cantilever beam accelerometers of FIGS. 1A and B may be relatively simple and easy to fabricate, such designs may not be suitable for sensing acceleration in three axial directions. In particular, such designs may not provide a differential output signal in order to minimize noise.

FIG. 2 shows an accelerometer 200 based on a sensing membrane and a center proof mass, which is discussed, for example, by Li-Ping et al., J. MEMS, 2003, Volume 12, pages 433 to 439. The accelerometer 200 includes a sensing membrane, a center proof mass, a ring-shaped top electrode, a piezoelectric layer, and a mounting frame. Here, the balanced structure of accelerometer 200 minimizes cross sensitivity, and the extra mass significantly improves the overall sensitivity as compared to the designs shown in FIGS. 1A and 1B.

FIGS. 3A-C show top and side views of a tri-axis accelerometer 300 based on a piezoresistive sensing unit on top of a membrane, which is referred to, for example, by U.S. Patent Application Publication No. 2004/0027033. The tri-axis accelerometer 300 includes a disk-shaped suspension membrane 301, a proof mass 302 attached underneath the disk-shaped membrane 301, and piezoresistive sensing units 303 arranged on the surface of the disk-shaped membrane 301.

The designs shown in FIGS. 2 and 3A-C may be used for tri-axis sensing, but the suspension parts used in these designs are configured as whole membranes and therefore are relatively stiff. Here, the sensitivity of the piezoelectric sensing or piezoresistive sensing depends on the strain generated by the external acceleration. Therefore, a relatively stiff structure may not provide enough sensitivity. Moreover, having a strip or disc-like design may lead to cross talk since an acceleration in one direction, for example, may result in a deformation of the sensing films in other directions thereby requiring a more complicated signal processing to achieve a clean signal. Moreover still, devices having a suspension membrane design may occupy significant space on a microchip, which may increase the cost of such devices.

SUMMARY OF THE INVENTION

The exemplary embodiment of the present invention provides an exemplary tri-axis accelerometer, which may be provided on one monolithic microchip, and which detects output signals in three orthogonal axial directions, each direction being fully differential.

According to an exemplary embodiment of the present invention, a proof mass is arranged in the center of a sensor unit with center-symmetrical support/suspension springs, which are used to provide suspension to the proof mass, and to provide a connection between the proof mass and the anchor positions. Each spring unit may include two identical springs, which provide fully differential output signals. Sensing units may be arranged on top of the springs so that the sensor unit may be more easily fabricated via conventional batch processes. In this regard, the sensing units may be, for example, either piezoelectric or piezoresistive, and an output signal in each of three axial directions may be detected using a single common pick-up circuitry.

An exemplary embodiment of the present invention is directed to a tri-axis accelerometer, which includes a proof mass, at least four anchor points arranged in at least two opposite pairs, a first pair of anchor points being arranged opposite one another along a first axis, a second pair of anchor points being arranged opposite one another along a second axis, the first axis and the second axis being perpendicular to one another, and at least four spring units to connect the proof mass to the at least four anchor points, the spring units each including a pair of identical springs, each spring including a sensing unit.

Another exemplary embodiment of the present invention is directed to a tri-axis accelerometer, in which the sensing unit is arranged on the spring.

Yet another exemplary embodiment of the present invention is directed to a tri-axis accelerometer, in which the sensing unit includes a piezoelectric layer.

Still another exemplary embodiment of the present invention is directed to a tri-axis accelerometer, in which the sensing unit includes a piezoelectric resistor.

Yet another exemplary embodiment of the present invention is directed to a tri-axis accelerometer, in which the pair of identical springs are arranged to detect a fully differential output signal.

Still another exemplary embodiment of the present invention is directed to a tri-axis accelerometer, in which the pair of identical springs are arranged parallel to each other and perpendicular with respect to a longitudinal axis along the connection between the proof mass and a respective anchor point.

Yet another exemplary embodiment of the present invention is directed to a tri-axis accelerometer, which includes only one pick-up circuit arrangement to detect the fully differential output signal of each pair of identical springs.

Still another exemplary embodiment of the present invention is directed to a tri-axis accelerometer, in which the tri-axis accelerometer is fabricated using one of a Surface MEMS process and a Bulk MEMS process.

Yet another exemplary embodiment of the present invention is directed to a tri-axis accelerometer, in which the proof mass, the at least four anchor points, and the at least four springs are arranged on one monolithic microchip.

Another exemplary embodiment of the present invention is directed to a tri-axis accelerometer, which includes a proof mass, a plurality of anchor points arranged in at least two pairs opposite one another along at least two axial directions that are perpendicular to one another, and a plurality of spring units to connect the proof mass to the plurality of anchor points, the spring units each including a pair of identical springs, each spring including a sensing unit.

Yet another exemplary embodiment of the present invention is directed to a tri-axis accelerometer, in which the pair of identical springs are arranged to detect a fully differential output signal.

Still another exemplary embodiment of the present invention is directed to a tri-axis accelerometer, in which the pair of identical springs are arranged parallel to each other and perpendicular with respect to a longitudinal axis along the connection between the proof mass and a respective anchor point.

Yet another exemplary embodiment of the present invention is directed to a tri-axis accelerometer, which further includes only one pick-up circuit arrangement to detect the fully differential output signal of each pair of identical springs.

Still another exemplary embodiment of the present invention is directed to a tri-axis accelerometer, in which the proof mass, the plurality of anchor points, and the plurality of springs are arranged on one monolithic microchip.

Another exemplary embodiment of the present invention is directed to a method of fabricating a tri-axis accelerometer, the method including providing a substrate layer, providing an intermediate layer on the substrate layer, providing a top layer on the intermediate layer, providing a sensing material on the top layer, patterning the top layer to form at least four pairs of sensing structure elements underneath the sensing material, and a proof mass arranged between the at least two pairs of sensing structure elements, the at least four pairs of sensing structure elements arranged along at least two axial directions that are perpendicular to one another, removing a portion of the intermediate layer underneath the sensing structure elements, and removing a portion of the intermediate layer underneath at least a part of the proof mass.

Yet another exemplary embodiment of the present invention is directed to a method of fabricating a tri-axis accelerometer, in which the sensing material includes at least one of a piezoelectric and piezoresistive material.

Still another exemplary embodiment of the present invention is directed to a method of fabricating a tri-axis accelerometer, in which the at least four pairs of sensing structure elements are arranged to detect a fully differential output signal.

Yet another exemplary embodiment of the present invention is directed to a method of fabricating a tri-axis accelerometer, in which each pair of sensing structure elements includes two parallel structures.

Still another exemplary embodiment of the present invention is directed to a method of fabricating a tri-axis accelerometer, the method including providing only one pick-up circuit arrangement to detect the fully differential output signal of each pair of identical springs.

Yet another exemplary embodiment of the present invention is directed to a method of fabricating a tri-axis accelerometer, the method including patterning the substrate layer to form an additional proof mass.

BRIEF DESCRIPTION OF THE DRAWINGS

FIG. 3A is a top view of a tri-axis accelerometer, which includes piezoresistive sensing units arranged on the surface of a disk-shaped suspension membrane, and a proof mass attached underneath the membrane.

FIG. 3B is a side view of the tri-axis accelerometer of FIG. 3A, demonstrating a movement of its proof mass in a Z-axis direction.

FIG. 3C is a side view of the tri-axis accelerometer of FIG. 3A, demonstrating a movement of its proof mass in an X/Y direction.

FIG. 10E shows an exemplary fifth stage of the exemplary bulk MEMS method for fabricating an exemplary tri-axis accelerometer.

DETAILED DESCRIPTION

Figure 4A:
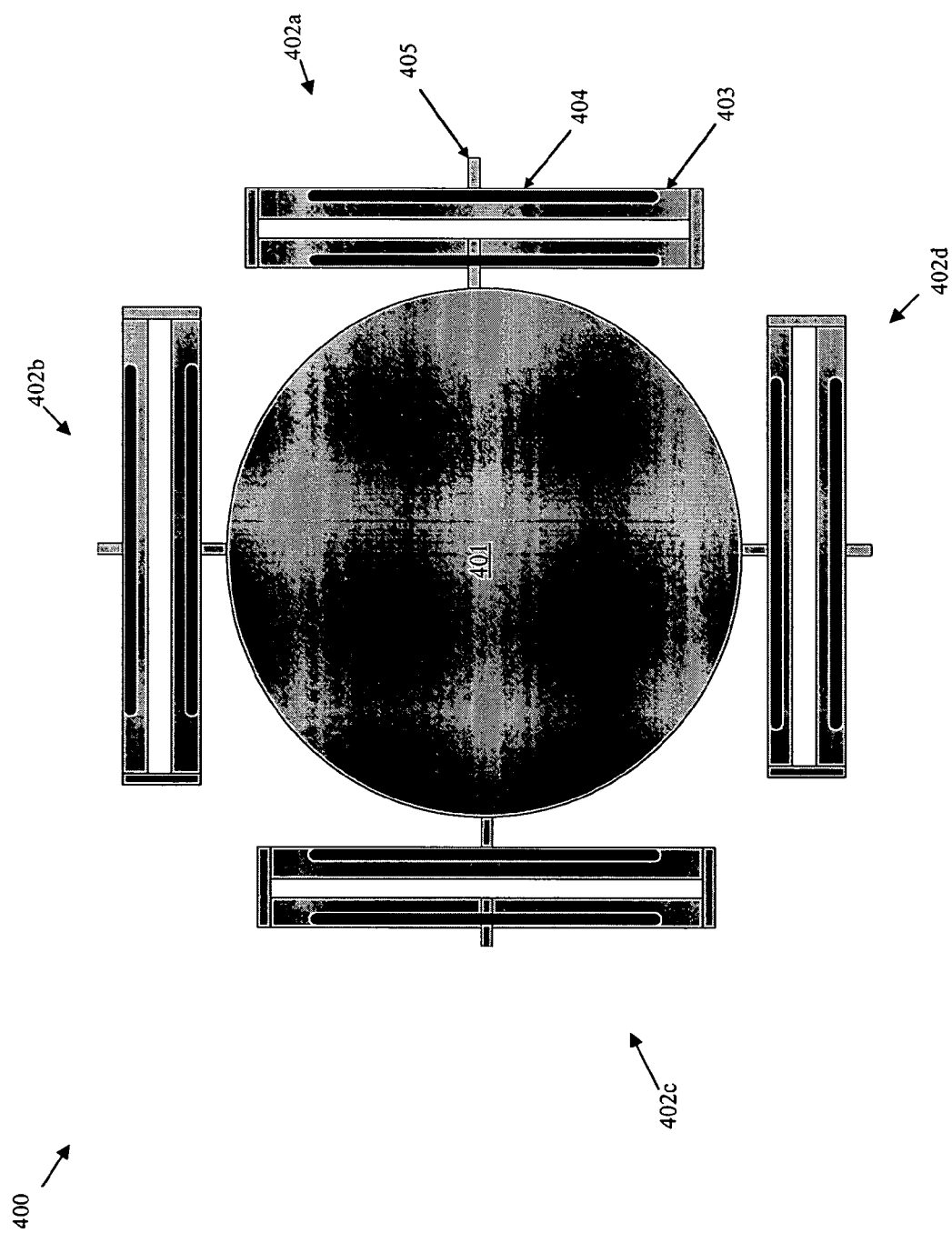
FIG. 4A shows an exemplary tri-axis accelerometer according to an exemplary embodiment of the present invention.

FIG. 4A shows an exemplary tri-axis accelerometer 400 according to an exemplary embodiment of the present invention. The exemplary tri-axis accelerometer 400 includes a center proof mass 401 surrounded by four spring units 402a-d, which are each attached on one side to the center proof mass 401, and on the other side to an anchor point 405. The spring units 402a-d each include two identical suspension springs 403. Each suspension spring 403 includes a sensing element 404 arranged on top of the suspension spring. In this regard, the sensing element 404 may be, for example, a piezoelectric layer or a piezoresistor.

Figure 4B:
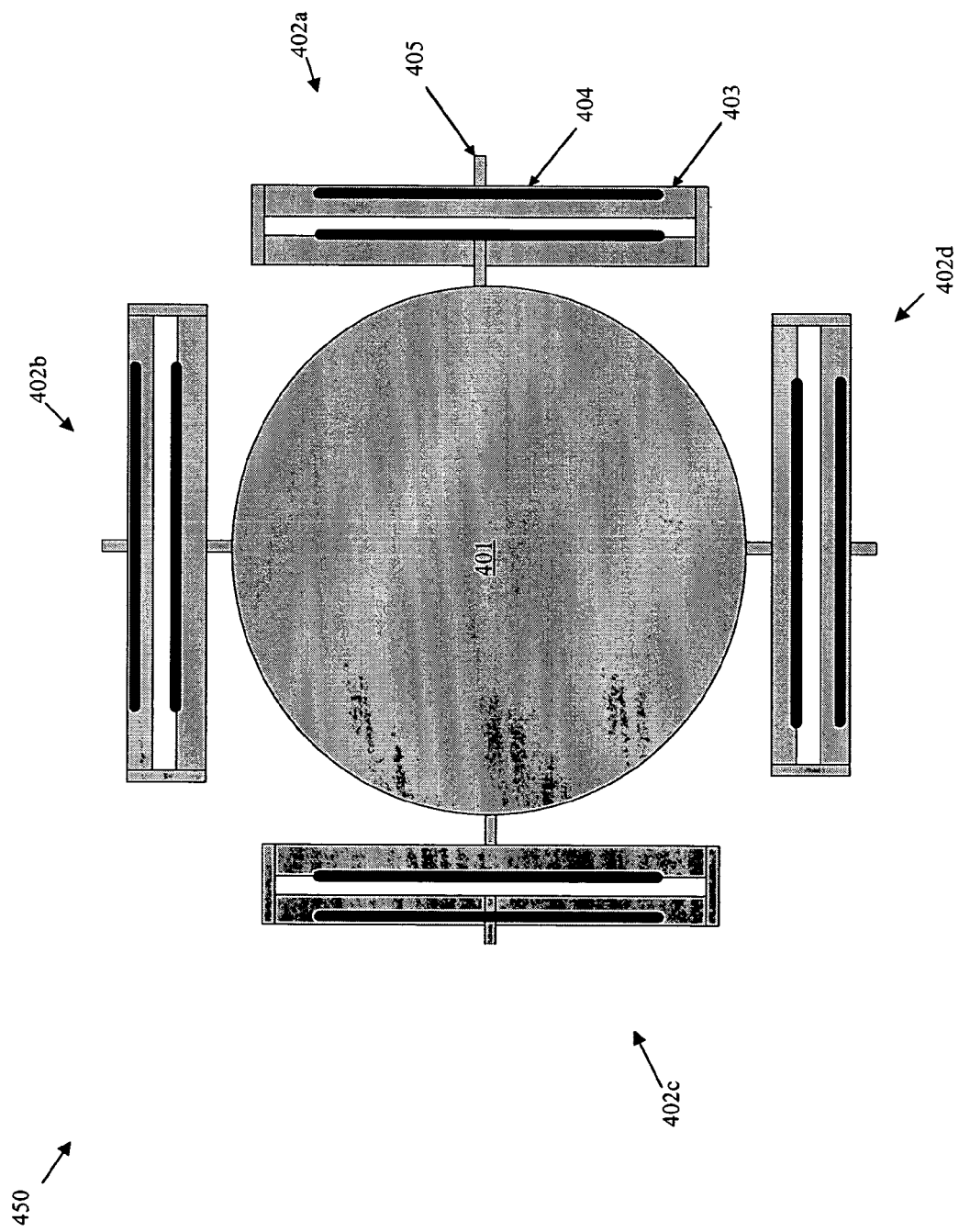
FIG. 4B shows an exemplary tri-axis accelerometer, which is similar to the exemplary tri-axis accelerometer of FIG. 4A but with a differently arranged sensor element.

FIG. 4B shows an exemplary tri-axis accelerometer 450, which is similar to the exemplary tri-axis accelerometer 400 of FIG. 4A, but with a differently configured sensor element 403, which is arranged on top of the suspension spring 403 so as to be facing away from the proof mass 401, whereas in FIG. 4A, only one of the sensor elements 403 of each pair of suspension springs 402a-d is arranged facing away from the proof mass 401, the other sensor element 403 of the pair being arranged facing towards the proof mass 401.

Figure 4C:
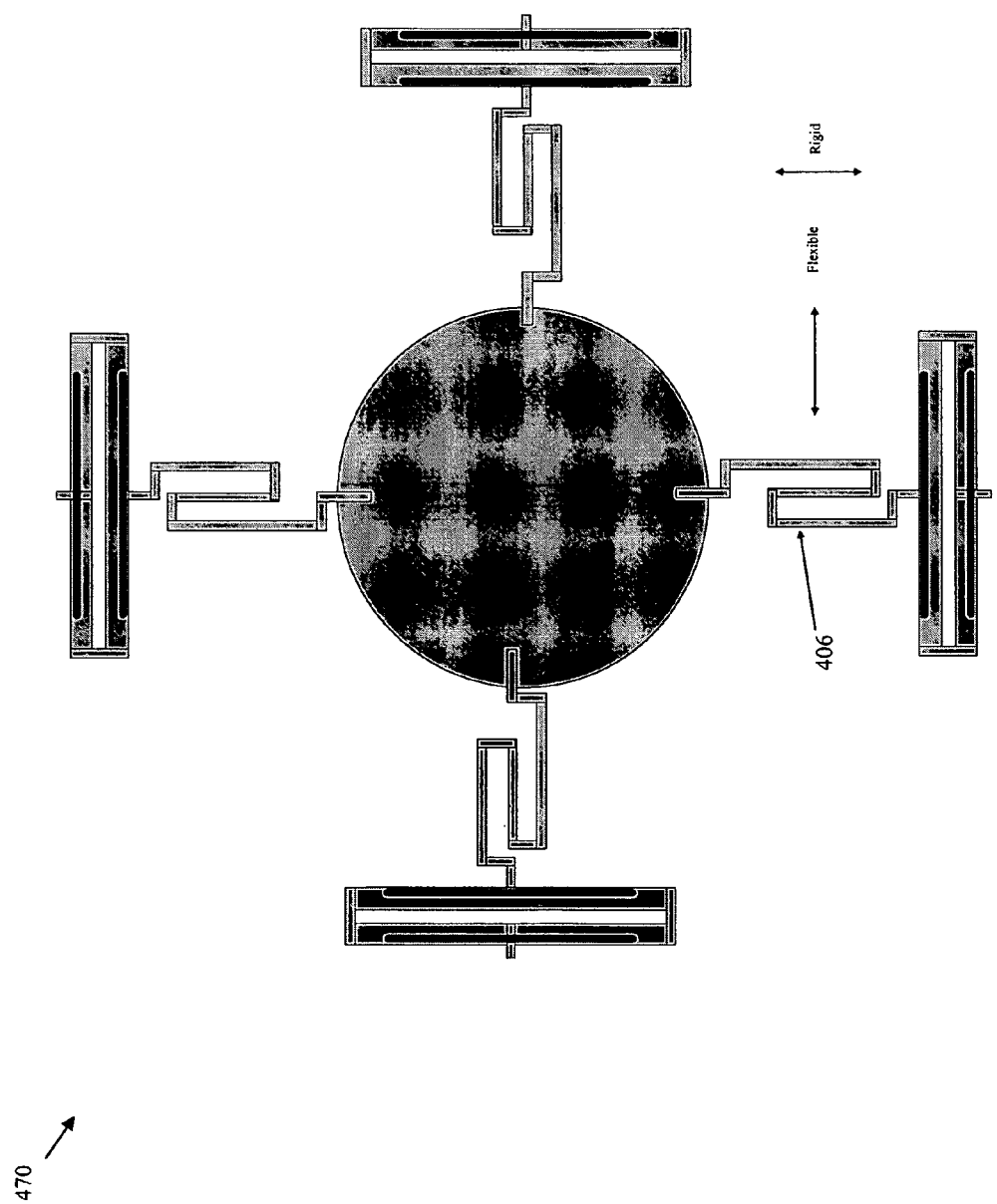
FIG. 4C shows an exemplary tri-axis accelerometer, which is similar to the exemplary tri-axis accelerometer of FIG. 4A but with specially-configured springs.

FIG. 4C shows an exemplary tri-axis accelerometer 470, which is similar to the exemplary tri-axis accelerometer 400 of FIG. 4A, but with specially-configured springs 406 to connect each of the springs units 402a-d to the proof mass 401. Here, the specially-configured springs 406 are flexible in one direction and rigid in another direction. That is, the specially-configured springs 406 are flexible in a direction that allows horizontal movement of the proof mass 401 with respect to the particular spring unit, and are rigid in a direction that prevents vertical movement of the proof mass 401 with respect to the particular spring unit.

Table 1 below shows a comparison of the exemplary accelerometers of the FIGS. 4A-C to the conventional accelerometers of FIGS. 2 and 3. As indicated in Table 1, the exemplary accelerometers of FIGS. 4A-C and the conventional accelerometers of FIGS. 2 and 3 all provide tri-axis acceleration sensing and may operate according in a piezoelectric or piezoresistive manner. However, the device area occupied by the conventional accelerometers of FIGS. 2 and 3 is greater that the device area occupied by the exemplary accelerometers of FIGS. 4A-C, which have a greater output sensitivity and may be fabricated using MEMS and bulk MEMS processes.

TABLE 1

Figure 1:
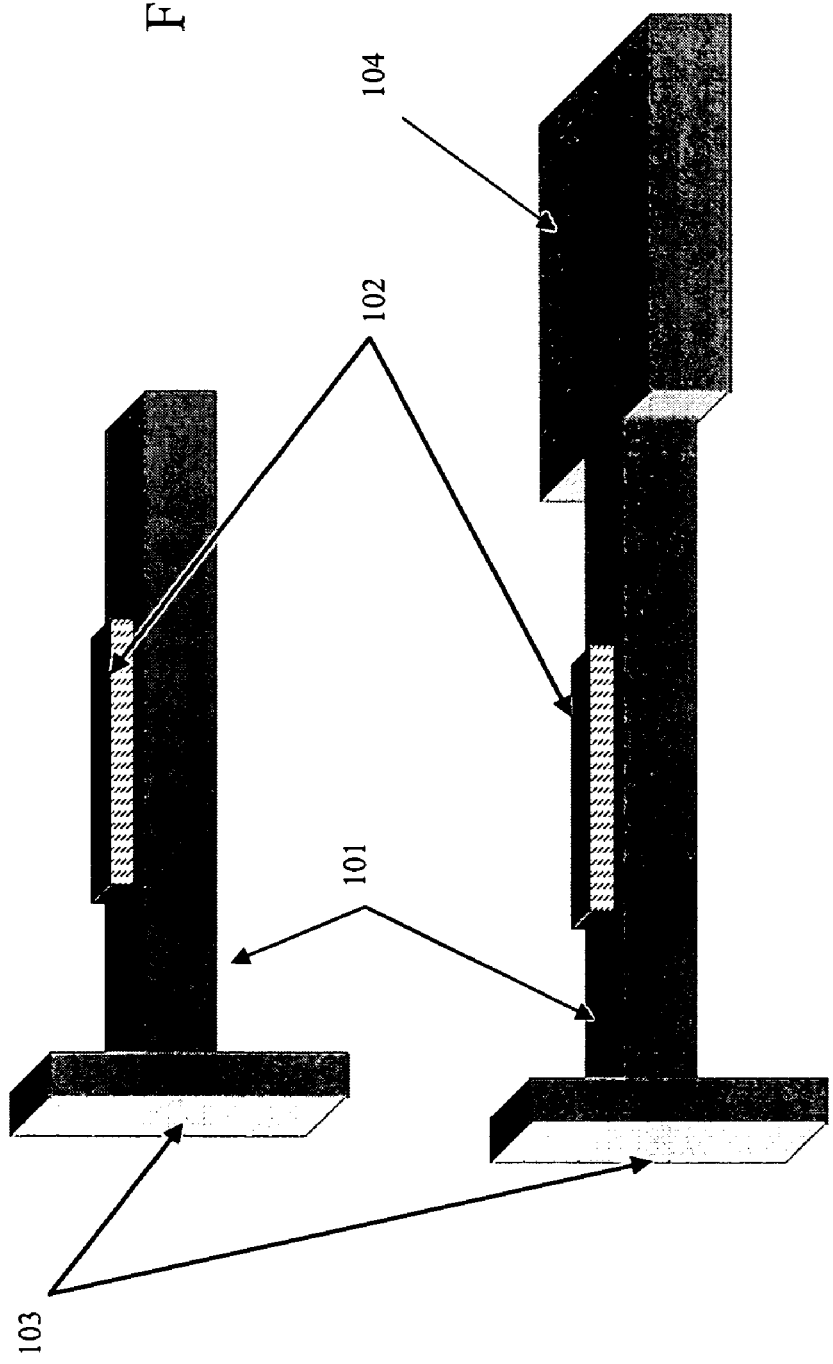
FIG. 1A shows an available cantilever beam accelerometer.
FIG. 1B shows the cantilever beam accelerometer of FIG. 1A with a proof mass attached to its tip to generate more strain along the suspension beam and thereby provide more sensitive output signals as compared to the accelerometer of FIG. 1A.
Figure 2:
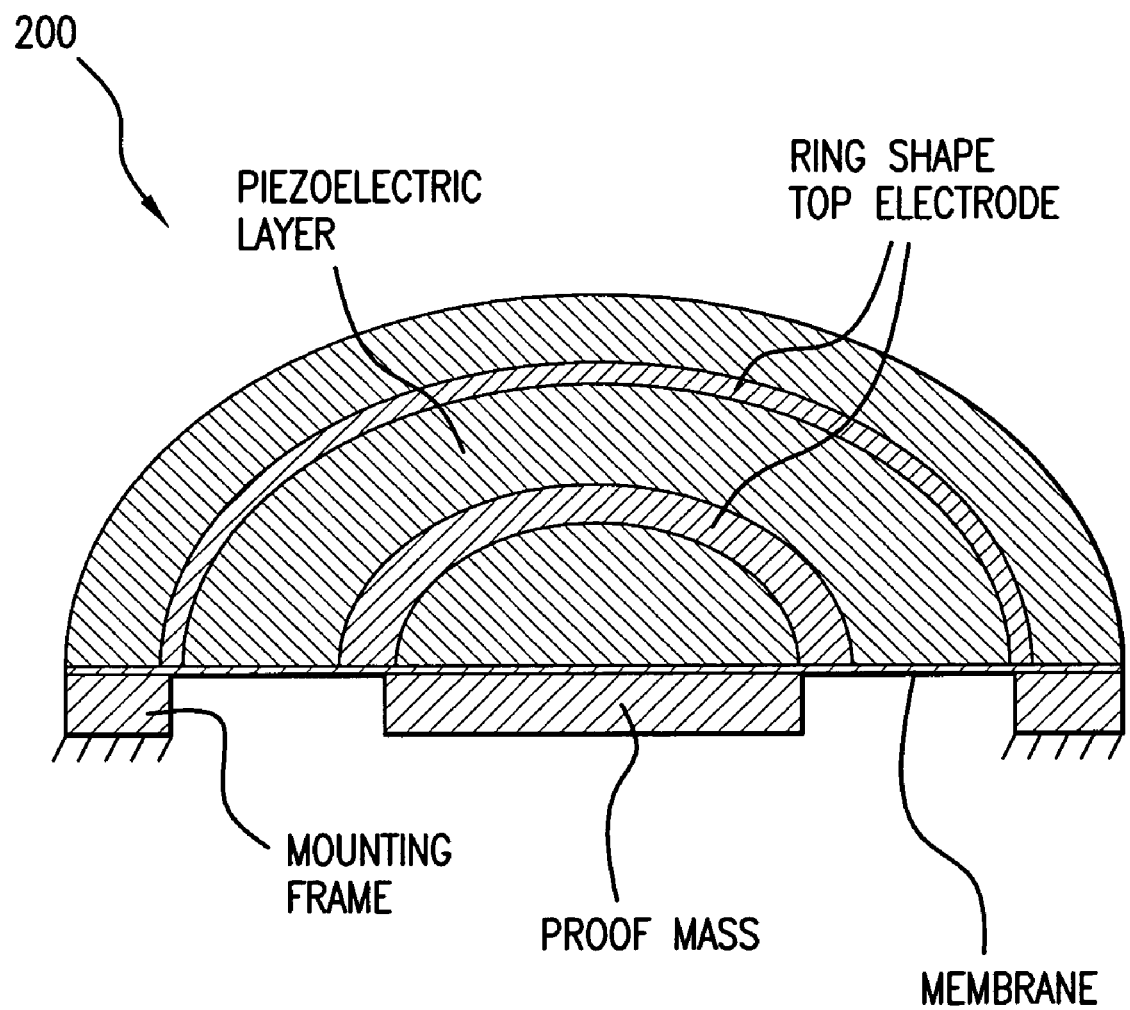
FIG. 2 shows an accelerometer based on a sensing membrane and a center proof mass, whose balanced structure minimizes cross sensitivity, and extra mass provides an improved overall sensitivity as compared to the accelerometers of FIGS. 1A and 1B.

|  | Design in FIG. 2-3 | Design in FIGS. 4A-C |
|---|---|---|
| Tri-axis acceleration sensing | Yes | Yes |
| Output sensitivity which depends on the strain in the sensing elements | Small | Large |
| Devices area | Large | Small |
| It works for both piezoelectric sensing and piezoresistive sensing | Yes | Yes |
| Design could be fabricated by using surface MEMS processes and bulk MEMS processes | No | Yes |

Figure 5:
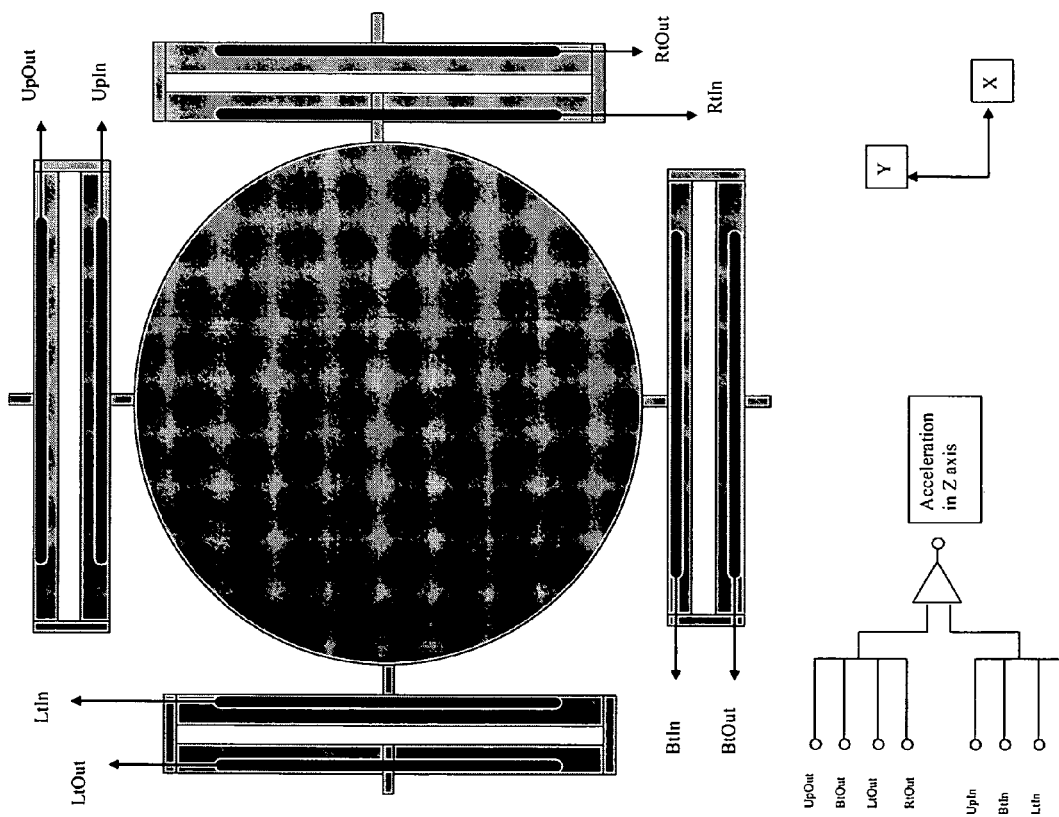
FIG. 5 shows an exemplary Z-axis acceleration signal differential detection of the exemplary tri-axis accelerometer of FIG. 4A.

FIG. 5 shows an exemplary Z-axis acceleration signal differential detection of the exemplary tri-axis accelerometer of FIG. 4A. Here, each pair of the four pairs of suspension springs has been designated according to their respective arrangement in the drawing. In particular, one of the four pairs of suspension springs is designated as the "upper" pair, one is designated as the "bottom" pair, one is designated as the "right" pair, and one is designated as the "left" pair. Additionally, one sensor element of each pair of suspension springs is designated as the "input", and the other sensor element of each pair is designated as the "output". The four output sensor signals "UpOut", "BtOut", "LtOut", and "RtOut" from the output sensor elements of the upper, bottom, left and right pairs of suspension springs are combined together as one input into a comparator, and the four input sensor signals "UpIn", "BtIn", LtIn", and "RtIn" from the input sensor elements on the upper, bottom, left and right pairs of suspension springs are combined together as another input to the comparator.

Figure 6A:
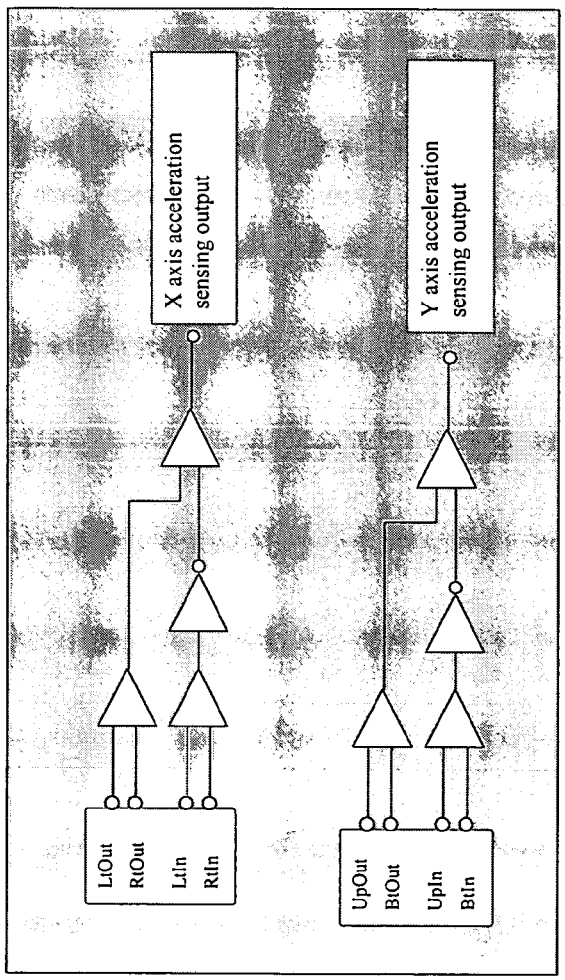
FIG. 6A is a schematic diagram illustrating the X and Y acceleration sensing pick-up circuitry of the exemplary tri-axis accelerometer of FIG. 4A, where the device is fabricated using surface MEMS processes.
Figure 6B:
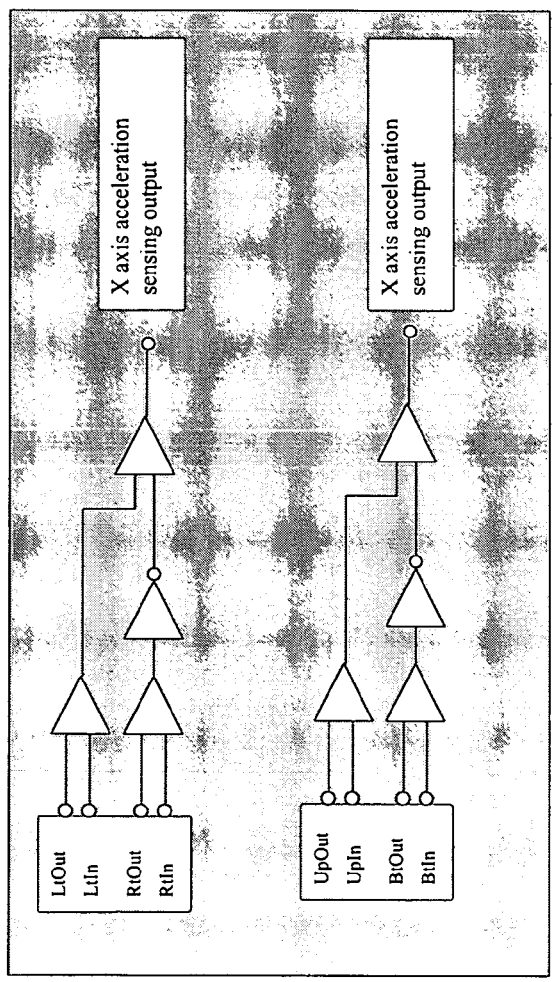
FIG. 6B is a schematic diagram illustrating the X and Y acceleration sensing pick-up circuitry of the exemplary tri-axis accelerometer of FIG. 4A, where the device is fabricated using Bulk MEMS processes.

FIGS. 6A and 6B each show in schematic form examples of X and Y acceleration sensing signal pick-up circuitry for the exemplary tri-axis accelerometer of FIG. 4A. More specifically, FIG. 6A shows in schematic form an example of the sensing pick-up circuitry if the devices are fabricated using surface MEMS processes. FIG. 6B shows in schematic form an example of the sensing pick-up circuitry if the devices are fabricated using Bulk MEMS processes.

In FIG. 6A, the left and right output sensor signals "LtOut" and "RtOut" from the output sensor elements on the left and right pairs of suspension springs are compared to left and right input sensor signals "LtIn" and "RtIn" from the input sensor elements on the left and right pairs of suspension springs to detect an external acceleration along the X axis, and the upper and bottom output sensor signals "UpOut" and "BtOut" from the two output sensor elements on the upper and bottom pairs of suspension springs are compared to the upper and bottom input sensor signals "UpIn" and "BtIn" from the input sensor elements on the upper and bottom pairs of suspension springs are compared to detect an external acceleration along the Y axis. In FIG. 6B, by contrast, the output and input sensor signals "LtOut" and "LtIn" from the output and input sensor elements on the left pair of suspension springs are compared to output and input sensor signals "RtOut" and "RtIn" from output and input sensor elements on the right pair of suspension springs to detect an external acceleration along the X axis, and the output and input sensor signals "UpOut" and "UpOut" from the output and input sensor elements on the upper pair of suspension springs is compared to the output and input sensor signals "BtOut" and "BtIn" from the output and input sensor elements on the bottom pair of suspension springs are compared to detect an external acceleration along the Y axis.

Figure 7:
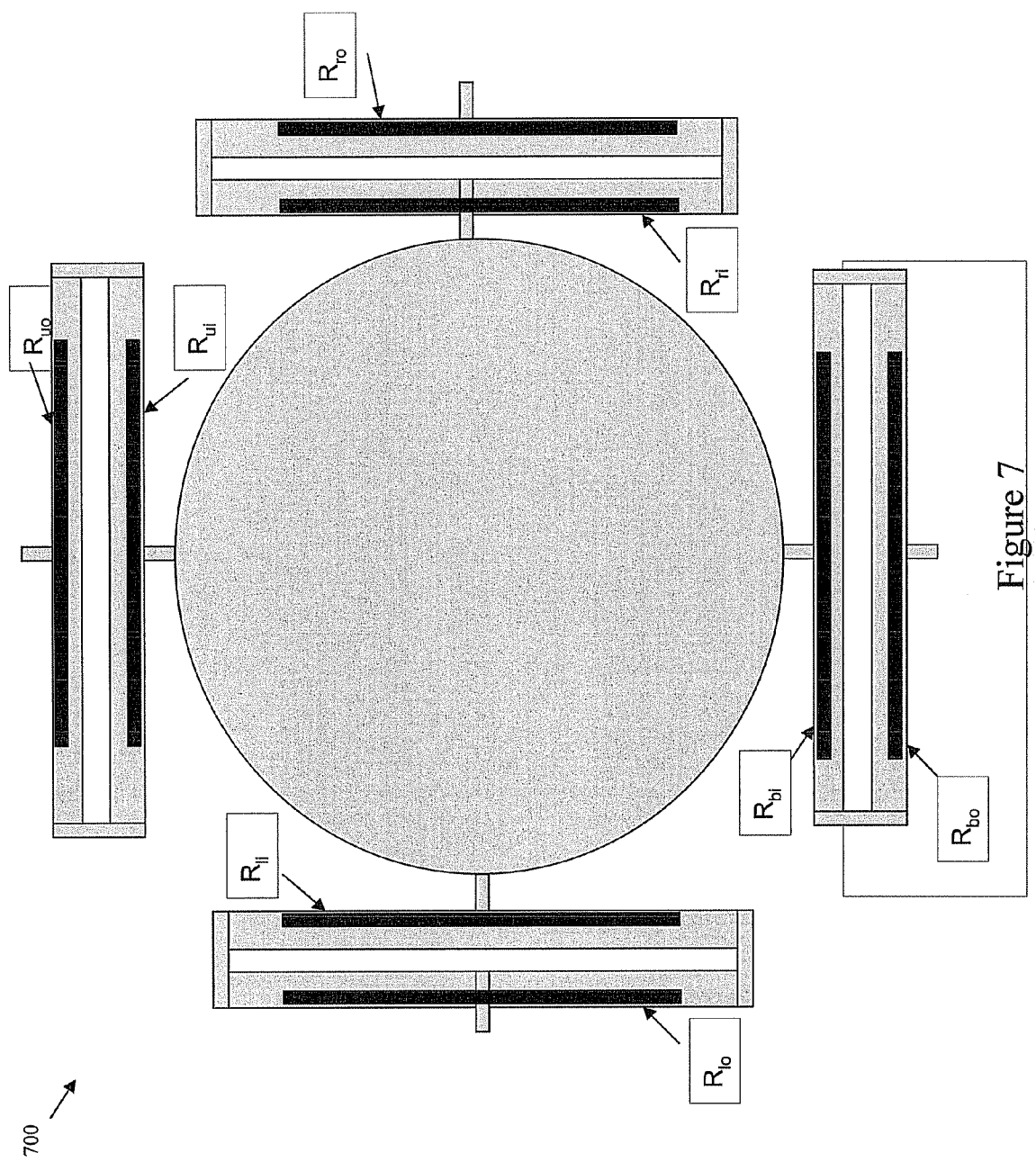
FIG. 7 shows an exemplary tri-axis accelerometer, which is similar to the exemplary tri-axis accelerometer of FIG. 4A except that piezoresistive sensing elements are used instead of piezoelectric sensing elements.

FIG. 7 shows an exemplary tri-axis accelerometer 700, which is similar to the exemplary tri-axis accelerometer 400 of FIG. 4A, except that piezoresistive sensing elements are used instead of piezoelectric sensing elements. In this regard, the resistance of the piezoresistor sensing element will change when there is an external acceleration, as shown for example in Table 2 below.

TABLE 2

| | Piezoresistor | $R_{uo}$ | $R_{ui}$ | $R_{bo}$ | $R_{bi}$ | $R_{ro}$ | $R_{ri}$ | $R_{lo}$ | $R_{li}$ |
|---|---|---|---|---|---|---|---|---|---|
| Surface MEMS | +X Acceleration | 0 | 0 | 0 | 0 | − | − | + | + |
| | +Y Acceleration | − | − | + | + | 0 | 0 | 0 | 0 |
| | +Z Acceleration | − | + | − | + | − | + | − | + |
| Bulk MEMS | +X Acceleration | 0 | 0 | 0 | 0 | − | + | + | − |
| | +Y Acceleration | − | + | + | − | 0 | 0 | 0 | 0 |
| | +Z Acceleration | − | + | − | + | − | + | − | + |

Figure 8A:
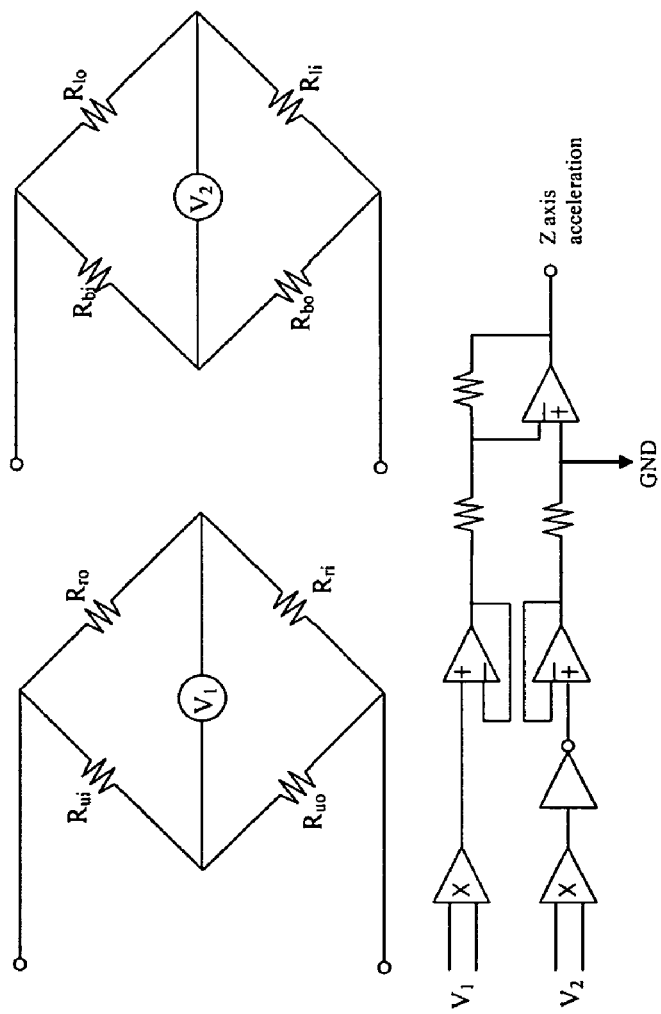
FIG. 8A is a schematic diagram illustrating exemplary electronic circuitry to detect a Z-axis differential acceleration output signal of the exemplary tri-axis accelerometer of FIG. 7.

FIG. 8A shows in schematic form exemplary electronic circuitry to detect a Z-axis differential acceleration output signals of the exemplary tri-axis accelerometer 700 of FIG. 7. Here, the voltage V1 across the midpoint between the upper resistor pairs $R_{ui}$ and $R_{uo}$, and the right resistor pairs $R_{ro}$ and $R_{ri}$, is compared to the voltage V2 across the midpoint between the bottom resistor pairs $R_{bi}$ and $R_{bo}$, and the left resistor pairs $R_{lo}$ and $R_{li}$. Note, for bulk MEMS and surface MEMS devices the signal pick-up circuitry may be the same.

Figure 8B:
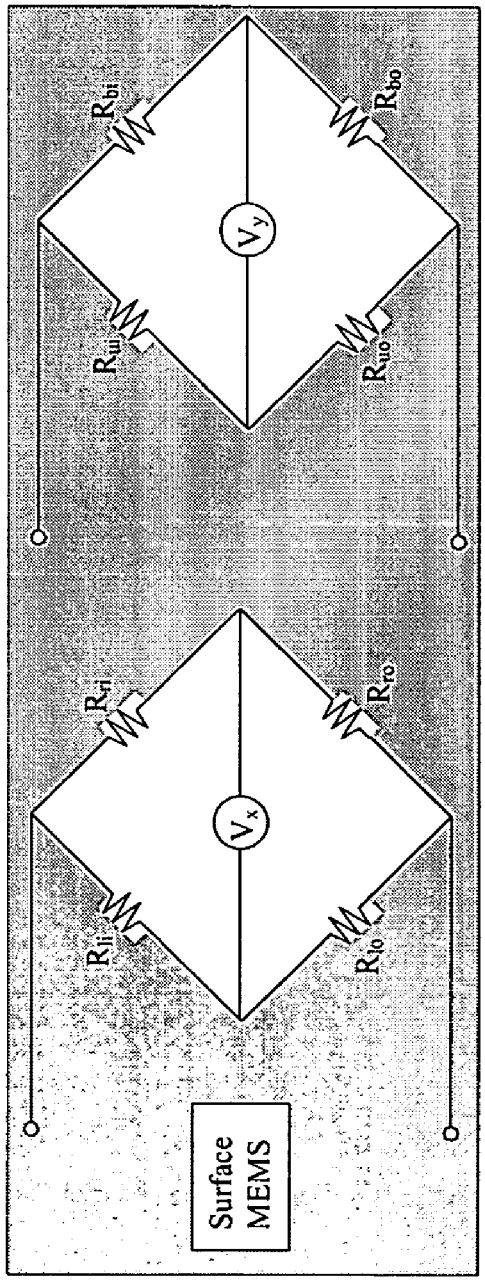
FIG. 8B is a schematic diagram illustrating exemplary electronic circuitry to detect X and Y differential acceleration output signals of the exemplary tri-axis accelerometer of FIG. 7, where the device is fabricated using surface MEMS processes.
Figure 8C:
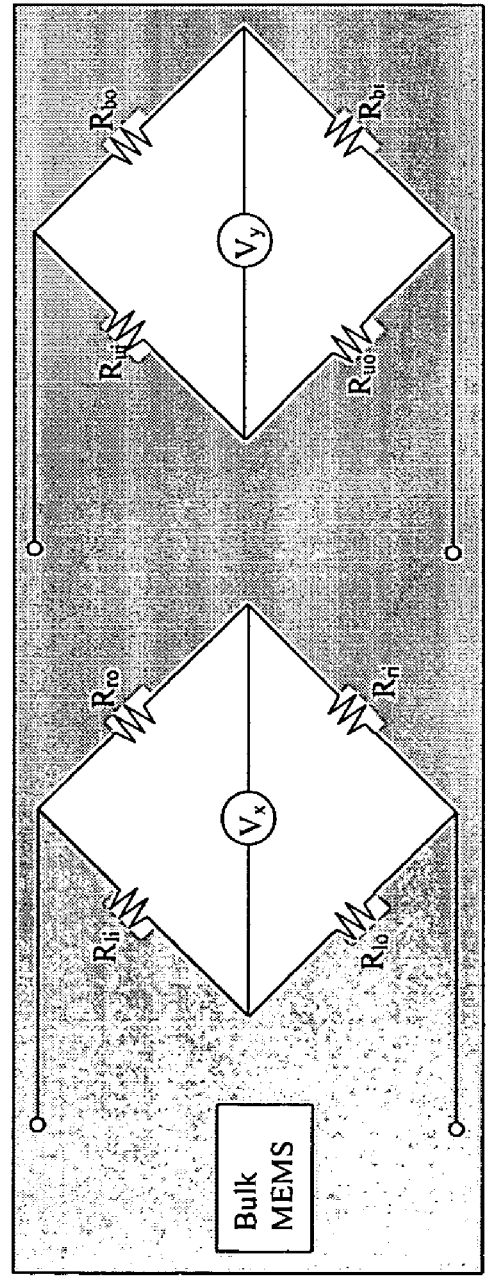
FIG. 8C shows an example of X and Y acceleration sensing pick-up of the exemplary tri-axis accelerometer of FIG. 7, where the device is fabricated using Bulk MEMS processes.

FIGS. 8B and 8C each show in schematic form examples of X and Y acceleration sensing signal pick-up circuitry of the exemplary tri-axis accelerometer of FIG. 7. More specifically, FIG. 8B shows in schematic form an example of the sensing pick-up circuitry that may be provided if the devices are fabricated using surface MEMS processes, and FIG. 8C shows in schematic form an example of the sensing pick-up circuitry that may be provided if the devices are fabricated using Bulk MEMS processes.

FIGS. 9A to 9E show exemplary stages S1 to S5 of an exemplary method for fabricating an exemplary surface MEMS tri-axis accelerometer, which is formed from a three-layer structure consisting of a substrate layer 1101, an intermediate layer 1102, and a top layer 1103. The substrate layer 1101 may include, for example, a single crystal silicon, the intermediate layer 1102 may include, for example, a thermally grown silicon dioxide layer or other type of deposited oxide layer, and the top layer 1103 may include, for example, a single crystal silicon. Alternatively, the substrate layer 1101 may include, for example, a grown polysilicon structure layer, the intermediate layer 1102 may include, for example, a thermal oxide or low temperature oxide layer, and the top layer 1103 may include, for example, an epitaxially grown polycrystalline silicon or silicon-germanium layer.

Figure 9A:
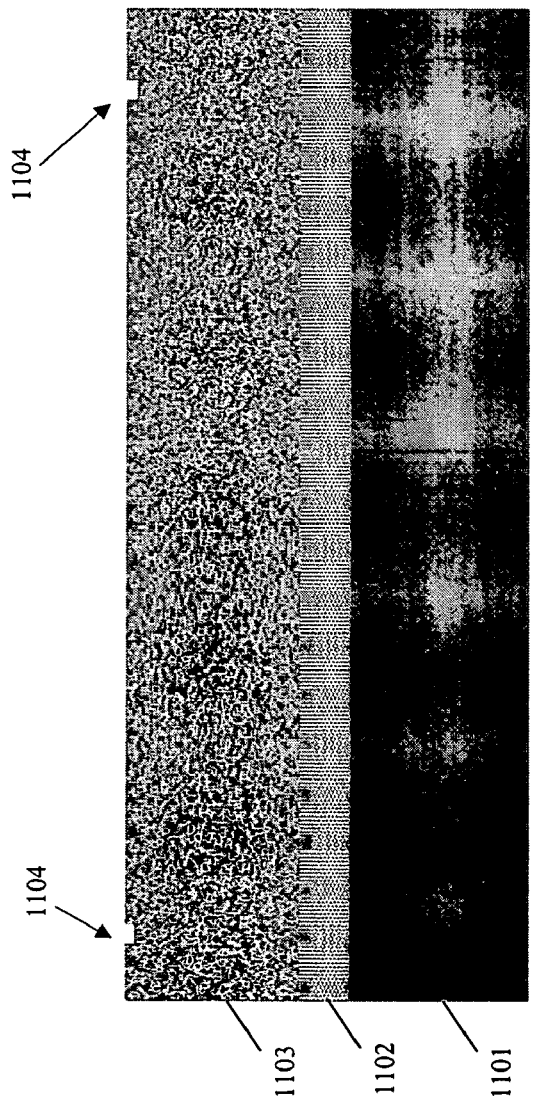
FIG. 9A shows an exemplary first stage of an exemplary method for fabricating an exemplary surface MEMS tri-axis accelerometer.
Figure 9B:
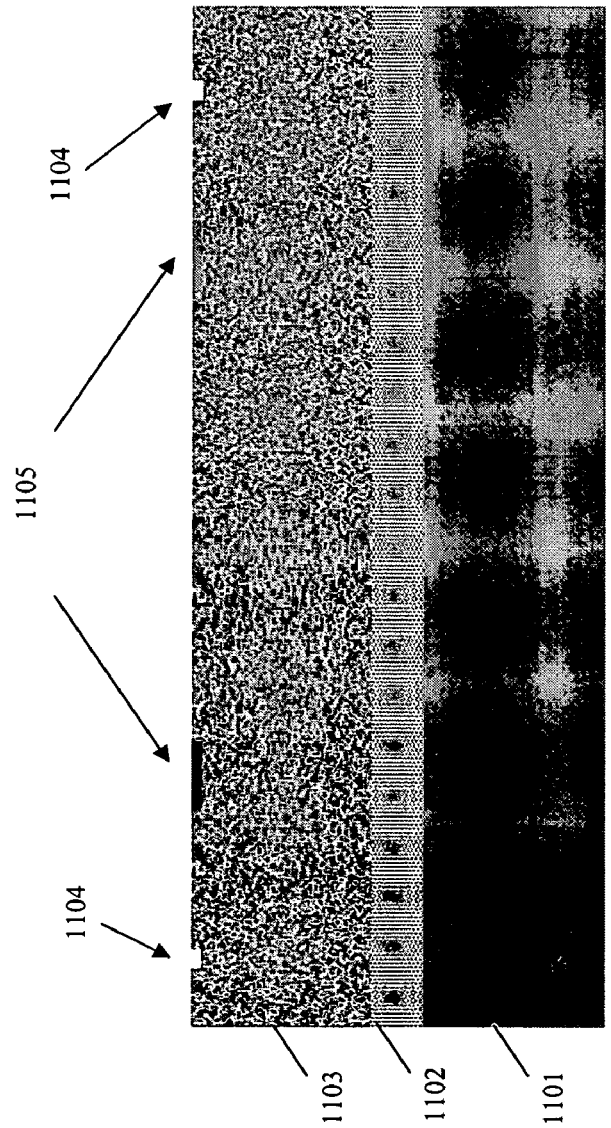
FIG. 9B shows an exemplary second stage of the exemplary method for fabricating an exemplary surface MEMS tri-axis accelerometer.

In stage S1, alignment marks 1104 are provided to the top layer 1103, as shown in FIG. 9A. In stage S2, piezo sensing units 1105 are provided, as shown in FIG. 9B. Here, in this instance, a piezoresistive material may be implanted to form piezoresistive sensing units, or alternatively, a piezoelectric material may be deposited to form piezoelectric sensing units. The piezoresistive material may implanted, for example, via ion implantation, and the piezorelectric material may be deposited, for example, via sputtering.

Figure 9C:
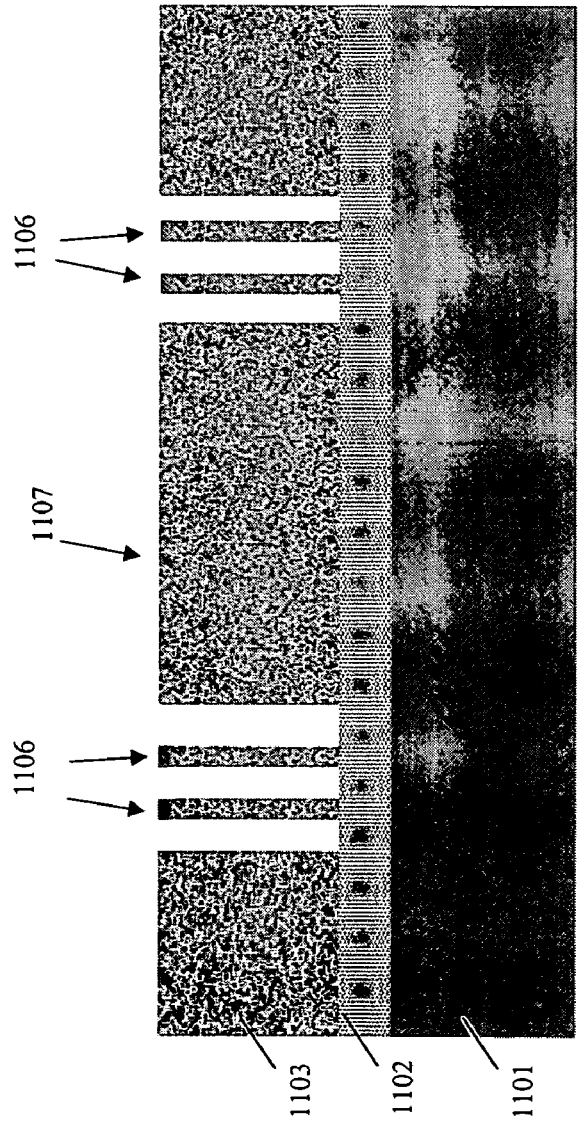
FIG. 9C shows an exemplary third stage of the exemplary method for fabricating an exemplary surface MEMS tri-axis accelerometer.

In stage S3, the top layer 1103 is patterned to form sensing structure elements 1106 and an upper proof mass 1107, as shown in FIG. 9C. Here, the sensing structure elements 1106 have been patterned so that the piezo sensing units remain as part of the sensing structure elements 1106. In this regard, a deep reactive ion trench etching may be employed.

Figure 9D:
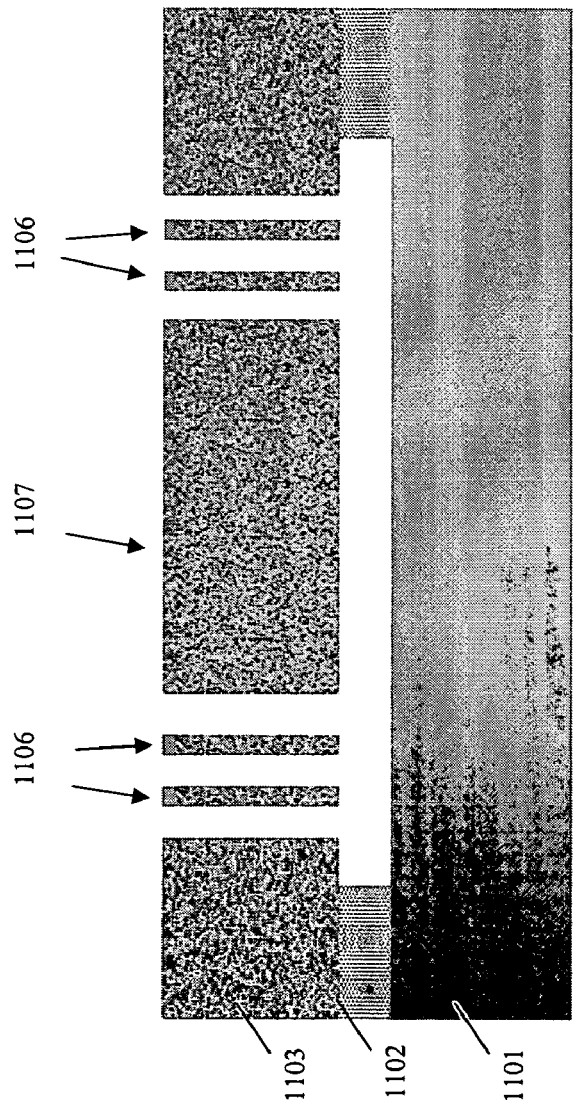
FIG. 9D shows an exemplary fourth stage of the exemplary method for fabricating an exemplary surface MEMS tri-axis accelerometer.

In stage S4, the portion of the intermediate layer 1103 underneath the sensing structure elements 1106 and proof mass 1107 has been removed, as shown in FIG. 9D, so as to release sensor structure elements 1106 and the proof mass 1107. In this regard, the portion of the intermediate layer 1102 underneath the sensing structure elements 1106 may be removed, for example, using a HF vapor etching process. In this instance, the proof mass 1107 may include perforations to facilitate a complete undercutting beneath the proof mass 1107, which ensures that the proof mass 1107 is fully released.

Figure 9E:
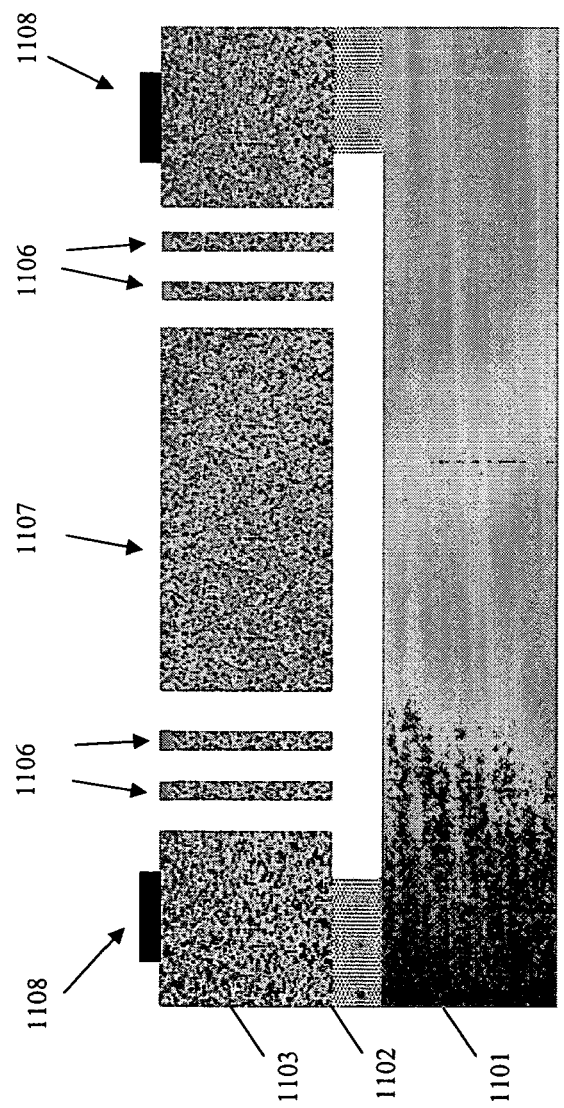
FIG. 9E shows an exemplary fifth stage of the exemplary method for fabricating an exemplary surface MEMS tri-axis accelerometer.

In stage S5, contact pads 1108 are provided on the top layer 1103, as shown in FIG. 9E. Here, the contact pads 1108 may made of a metal material and be used, for example, to provide sensor output signals. In particular, the contact pads 1108 may be, for example, a sputtered deposited metal or shadow masked.

FIGS. 10A to 10F show exemplary stages B1 to B6 of an exemplary bulk MEMS method for fabricating an exemplary tri-axis accelerometer, which is formed from a three-layer structure consisting of a substrate layer 1201, an intermediate layer 1202, and a top layer 1203. The substrate layer 1201 may include, for example, a single crystal silicon, the intermediate layer 1202 may include, for example, a thermally grown silicon dioxide layer or other type of deposited oxide layer, and the top layer 1203 may include, for example, a single crystal silicon. Alternatively, the substrate layer 1201 may include, for example, a grown polysilicon structure layer, the intermediate layer 1202 may include, for example, a thermal oxide or low temperature oxide layer, and the top layer 1203 may include, for example, an epitaxially grown polycrystalline silicon or silicon-germanium layer.

Figure 10A:
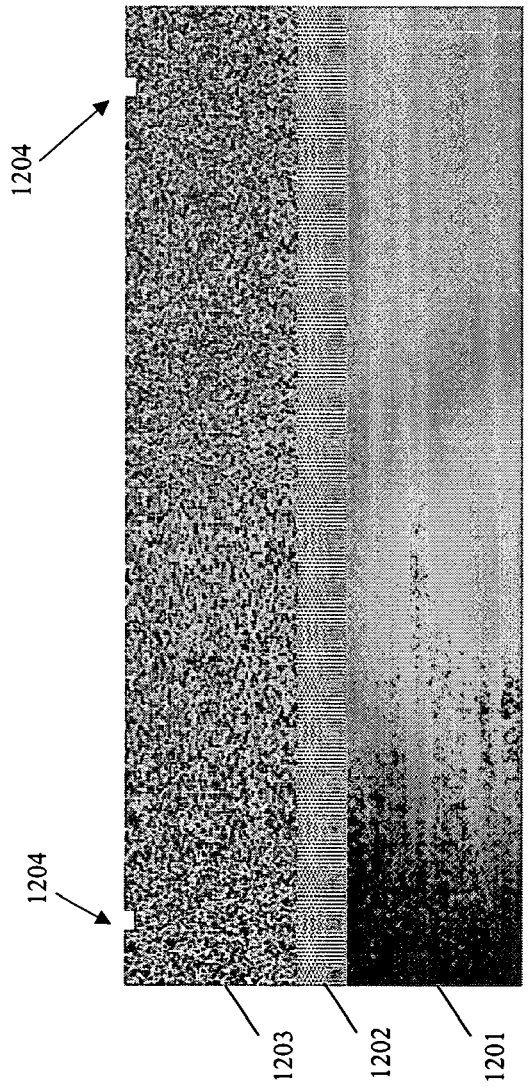
FIG. 10A shows an exemplary first stage of an exemplary bulk MEMS method for fabricating an exemplary tri-axis accelerometer.
Figure 10B:
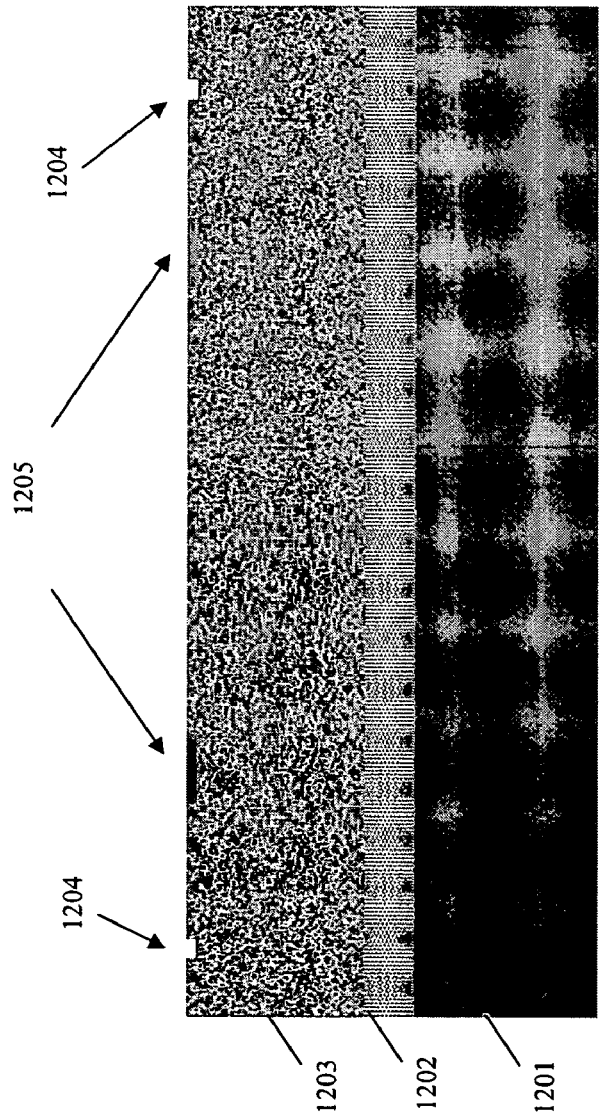
FIG. 10B shows an exemplary second stage of the exemplary bulk MEMS method for fabricating an exemplary tri-axis accelerometer.

In stage B1, alignment marks are provided to the top layer 1201, as shown in FIG. 10A. In stage B2, piezo sensing units 1205 are provided, as shown in FIG. 10B. Here, in this instance, a piezoresistive material may be implanted to form piezoresistive sensing units 1205, or alternatively, a piezoelectric material may be deposited to form piezoelectric sensing units 1205.

Figure 10C:
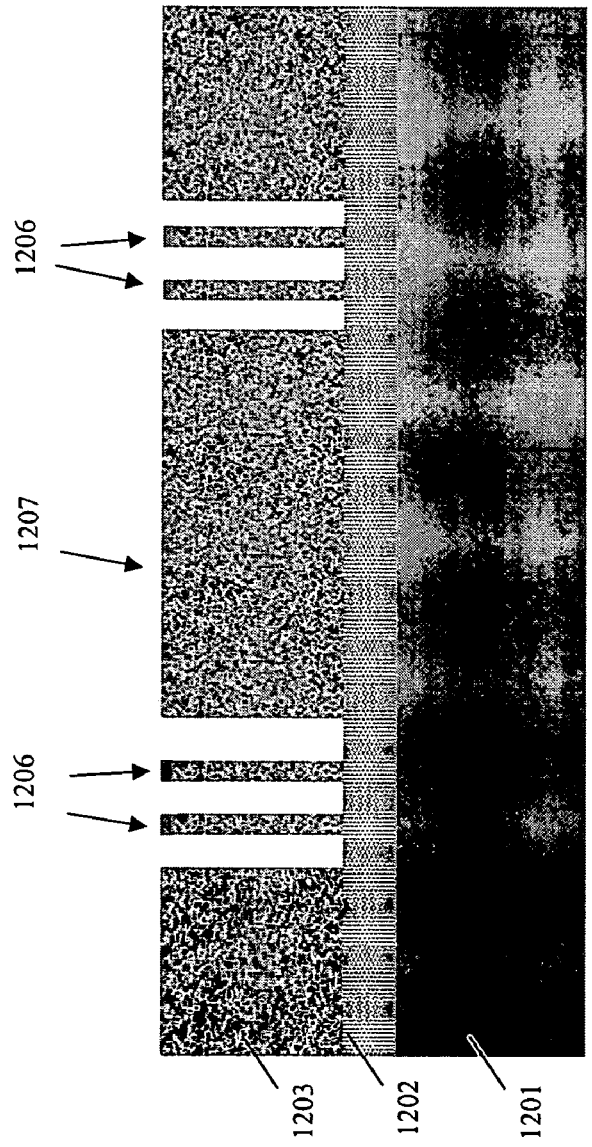
FIG. 10C shows an exemplary third stage of the exemplary bulk MEMS method for fabricating an exemplary tri-axis accelerometer.

In stage B3, the top layer 1201 is patterned to form sensing structure elements 1206 and an upper proof mass 1207, as shown in FIG. 10C. Here, the sensing structure elements 1206 have been patterned so that the piezo sensing units remain as part of the sensing structure elements 1206. In this regard, a deep reactive ion trench etching may be employed.

Figure 10D:
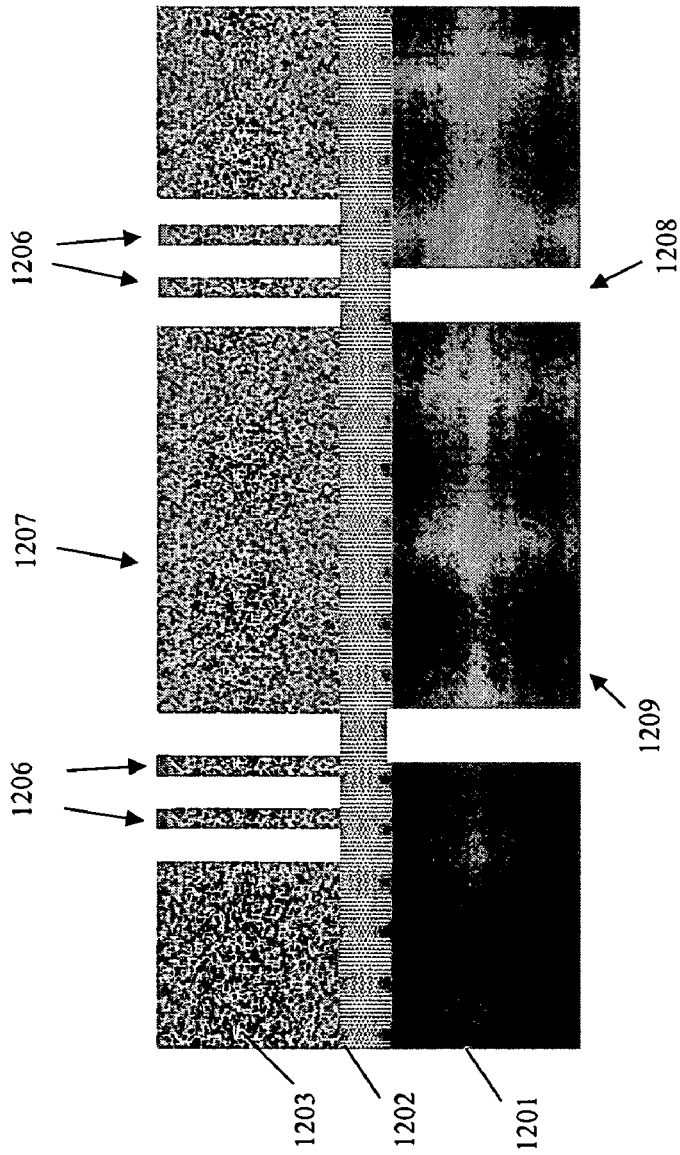
FIG. 10D shows an exemplary fourth stage of the exemplary bulk MEMS method for fabricating an exemplary tri-axis accelerometer.

In stage B4, the substrate layer 1201 is patterned, as shown in FIG. 10D, to form the "backside" trenches 1208, which define a lower proof mass 1209. Hence, a part of the substrate layer 1201 is used to form an additional proof mass 1209, which remains connected to the upper proof mass 1207 via intermediate layer 1202.

In stage B5, a portion of the intermediate layer 1202 underneath the sensing structure elements 1206, including a certain portion extending somewhat partially underneath the upper proof mass 1207, is removed, as shown in FIG. 10E, so as to release sensor structure elements 1206, and the combined upper and lower proof mass structures 1207/1209, which remain fixed together due to the unremoved portion of the intermediate layer that remains between them. In this regard, the upper proof mass 1207 does not include perforations so it will not be undercut completely and remain connected to the lower proof mass 1209. Here, an HF vapor etching process may be used to removal the desired portion of intermediate layer.

Figure 10F:
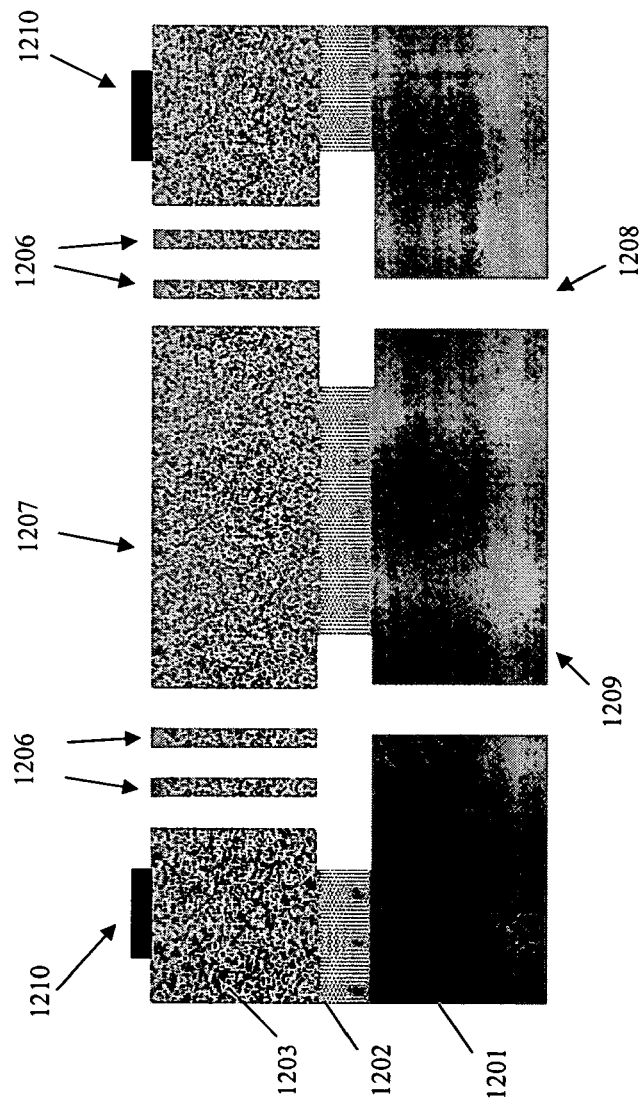
FIG. 10F shows an exemplary sixth stage of the exemplary bulk MEMS method for fabricating an exemplary tri-axis accelerometer.

In stage B6, contact pads 1210 are provided on the top layer 1201, as shown in FIG. 10F. Here, the contact pads 1210 may made of a metal material and be used, for example, to provide sensor output signals. In particular, the contact pads 1210 may be, for example, a sputtered deposited metal or shadow masked.

What is claimed is:

1. A tri-axis accelerometer, comprising:
    a proof mass;
    at least four anchor points arranged in at least two opposite pairs, a first pair of anchor points being arranged opposite one another along a first axis, a second pair of anchor points being arranged opposite one another along a second axis, the first axis and the second axis being perpendicular to one another; and
    at least four spring units to connect the proof mass to the at least four anchor points, the spring units each including a pair of identical springs, each spring including a sensing unit;
    wherein the at least four spring units extend alongside at least one external edge of, and external to, the proof mass.

2. The tri-axis accelerometer of claim 1, wherein the sensing unit is arranged on the spring.

3. The tri-axis accelerometer of claim 2, wherein the sensing unit includes a piezoelectric layer.

4. The tri-axis accelerometer of claim 2, wherein the sensing unit includes a piezoelectric resistor.

5. The tri-axis accelerometer of claim 1, wherein the pair of identical springs are arranged to detect a fully differential output signal.

6. The tri-axis accelerometer of claim 5, wherein the pair of identical springs are arranged parallel to each other and perpendicular with respect to a longitudinal axis along the connection between the proof mass and a respective anchor point.

7. The tri-axis accelerometer of claim 1, further comprising:
    only one pick-up circuit arrangement to detect the fully differential output signal of each pair of identical springs.

8. The tri-axis accelerometer of claim 1, wherein the tri-axis accelerometer is fabricated using one of a Surface MEMS process and a Bulk MEMS process.

9. The tri-axis accelerometer of claim 1, wherein the proof mass, the at least four anchor points, and the at least four springs are arranged on one monolithic microchip.

10. The tri-axis accelerometer of claim 1, wherein each of the at least four spring units extends lengthwise tangentially to a circumference of the proof mass.

* * * * *